United States Patent [19]
Ogawa et al.

[11] Patent Number: 5,185,732
[45] Date of Patent: Feb. 9, 1993

[54] RECORDING MEDIUM AND RECORDING AND REPRODUCING APPARATUS EMPLOYING THE RECORDING MEDIUM

[75] Inventors: Hiroshi Ogawa, Kanagawa; Yoichiro Sako, Chiba; Masanobu Yamamoto, Kanagawa, all of Japan

[73] Assignee: Sony Corporation, Tokyo, Japan

[21] Appl. No.: 367,770

[22] Filed: Jun. 19, 1989

[30] Foreign Application Priority Data

Jun. 20, 1988 [JP] Japan .................. 63-149958
Jul. 11, 1988 [JP] Japan .................. 63-172226
Feb. 23, 1989 [JP] Japan .................. 1-041784

[51] Int. Cl.$^5$ .................................................. G11B 7/00
[52] U.S. Cl. .................................. 369/47; 369/275.3; 369/275.4
[58] Field of Search ............... 369/47, 48, 50, 58, 369/105, 111, 124, 275.3, 275.4, 44.26, 44.41, 44.42

[56] References Cited

U.S. PATENT DOCUMENTS

| | | |
|---|---|---|
| 3,962,720 | 6/1976 | Braat . |
| 4,523,304 | 6/1985 | Satoh et al. .................. 369/64 |
| 4,691,310 | 9/1987 | Wine . |

FOREIGN PATENT DOCUMENTS

| | | |
|---|---|---|
| 0166199 | 1/1986 | European Pat. Off. . |
| 0265695A2 | 5/1988 | European Pat. Off. .................. 7/9 |
| 0265984A1 | 5/1988 | European Pat. Off. . |
| 0299573 | 1/1989 | European Pat. Off. . |
| 0299573A1 | 1/1989 | European Pat. Off. .................. 7/13 |
| 0325330A1 | 7/1989 | European Pat. Off. .................. 27/30 |
| 3620331 | 1/1987 | Fed. Rep. of Germany . |
| 005449 | 1/1984 | Japan . |
| 2069219A | 8/1981 | United Kingdom . |

OTHER PUBLICATIONS

Patent Abstracts of Japan, vol. 12, No. 240, [P-727][3087], Jul. 8, 1988.
Patent Abstracts of Japan, vol. 8, No. 92, [P-271][1529], Apr. 27, 1984.
JP-A-59 005449 (Matsushita Denki Sangyo K.K.), Jan. 12, 1984.
Patent Abstracts of Japan, vol. 11, No. 230 [P-599][2677], Jul. 28, 1987.
Patent Abstracts of Japan, vol. 13, No. 50 [P-823][3398], Feb. 6, 1989.

*Primary Examiner*—Aristotelis Psitos
*Assistant Examiner*—Nabil Hindi
*Attorney, Agent, or Firm*—Limbach & Limbach

[57] ABSTRACT

According to the invention, control data of a predetermined number of bits are pre-recorded on the recording track of a recording medium in the form of burst-like changes of the recording track's width to provide for recording control and reproducing control based on the control data.

20 Claims, 8 Drawing Sheets

RECORDING MEDIUM AND RECORDING AND REPRODUCING APPARATUS EMPLOYING THE RECORDING MEDIUM

BACKGROUND OF THE INVENTION

1. Field of the Invention

This invention relates to a recording medium, a recording apparatus and a reproducing apparatus employing the recording medium, that may be employed in a data storage system.

2. Prior Art

There are a variety of different types of apparatus for recording and reproducing data on a recording medium, operating on various recording/reproducing principles or utilizing recording media having various outer shapes.

In general, data recording media can be classified according to the operating principle, such as the magnetic and/or optical recording/reproducing principle, and also according to the outer shape, such as tape, card, or disc shaped recording media.

For example, there are disc players dedicated to reproduction, such as CD players for reproducing a so-called compact disc (CD) on which audio signals such as voice or musical sound are previously recorded in a digitized form.

In a compact disc (CD), as shown in FIG. 1, a data format having 98 frames as one subcode block is standardized, wherein each frame is constituted by a 24-bit sync signal, supplied as eight to fourteen modulation data, in which 1-symbol/8-bit signals are converted into data of 14 bits (L channel bit) constituting 1 symbol of subcode, i.e. one symbol being composed of 14 bits, 32 symbols of data, such as two sets of 12 symbols of play data and 4 symbols of parity bits, with each symbol being composed of $14 \times 32$ bits, and with three merging bits between the adjacent symbols. Thus each frame includes the sum total of 588 bits. The absolute address of each subcode block is given by the Q-channel signals of the above subcode and the data such as the play data are processed at intervals of one subcode block.

In CD-ROMs, as shown in FIG. 2, the left and right channel digital audio signals recorded on the compact disc (CD) are alternately connected at intervals of one word (2 symbols = 16 bits) so as to be treated as one channel of serial data and the CD is treated as a data storage device, a header section and sync signals are annexed ahead of each subcode block or 98-frames of data in the CD data format, such that each sector or block is constituted by 2K bytes of data.

Since the conventional CD player is dedicated to reproduction, attempts have been made to develop a data storage medium and the recording and/or reproducing system making use of the data storage medium, such as a so called "write once compact disc" (referred to as a "CD-WO") or an erasable compact disc (referred to as "CD-erasable"). This CD-WO or CD-erasable makes use of a magneto-optical disc which is formed by a rewritable magneto-optical recording medium and which is interchangeable with respect to the CD or CD-erasable, as disclosed in our co-pending U.S. application Ser. No. 102,009 filed on Sep. 28, 1987.

In the data recording/reproducing system making use of a recording medium such as the CD-WO or CD-erasable, it is necessary to control data efficiently on a block-by-block basis. However, in the CD data format, there are only a few address data, such that, when the data format is used in a data storage medium such as CD-WO or CD-erasable, it is difficult to control the data on a block-by-block basis.

OBJECTS AND SUMMARY OF THE INVENTION

It is a principal object of the present invention to provide a data recording/reproducing system wherein data can be controlled efficiently on a block-by-block basis.

It is another object of the present invention to provide a recording medium wherein data can be controlled efficiently on a block-by-block basis.

It is a further object of the present invention to provide a recording medium wherein interchangeability can be maintained with the CD or the CD-ROM.

It is a further object of the present invention to provide a recording apparatus and a reproducing apparatus wherein data can be controlled efficiently on a block-by-block basis.

It is yet another object of the present invention to provide a data recording apparatus which can cope with the case of recording in a continuous recording mode, as when recording musical data, or CD-ROM recording data, and which can utilize the address on the disc in the intermittent recording mode to provide for high speed accessing of recording/reproducing data for each sector as when using the apparatus as a CD-WO or as a CD-erasable.

The above and other objects of the present invention are attained by a recording medium having a recording track whose width is changed in a burst-like fashion to represent control data of a predetermined number of bits. The control data are the address data for each data block as one unit. The regions containing widthwise changes of the track, and thus including the address data, represent data record regions or data non-record regions depending on the recording mode, which can be either a mode in which the recorded data are subjected to convolution encoding or a mode in which the recorded data are subjected to sector complete type encoding.

In still another embodiment of the invention, the recording medium has a recording track whose centerline is periodically displaced across the track width with respect to an imaginary centerline of the recording track. The track width also changes in a burst-like fashion, wherein period data are pre-recorded by the deviation of the track centerline across the track width and control data of a predetermined number of bits are represented by the burst-like changes of the track width.

The invention further includes an apparatus for recording data on such a recording medium and including detecting means for detecting the control data signals recorded on the recording track, the detecting means including two pairs of detectors, each pair being arranged across the track width and producing a separate push-pull output, and control means for controlling the data recording operation on the recording track based on the control data. The control data are address data and the control means controls the recording on the recording track based on the reproduced address signals. When the recording medium has a recording track whose centerline is periodically displaced across the track width with respect to an imaginary centerline of the recording track, then the detecting means detects the period data as well as the control data and the control means controls the recording operation on the recording track based on the period data and the control data as represented by the push-pull outputs of the detecting means.

The above and other objects of the present invention will become more apparent upon reading the following description in conjunction with the accompanying drawings.

DESCRIPTION OF THE PREFERRED EMBODIMENTS

Figure 1:
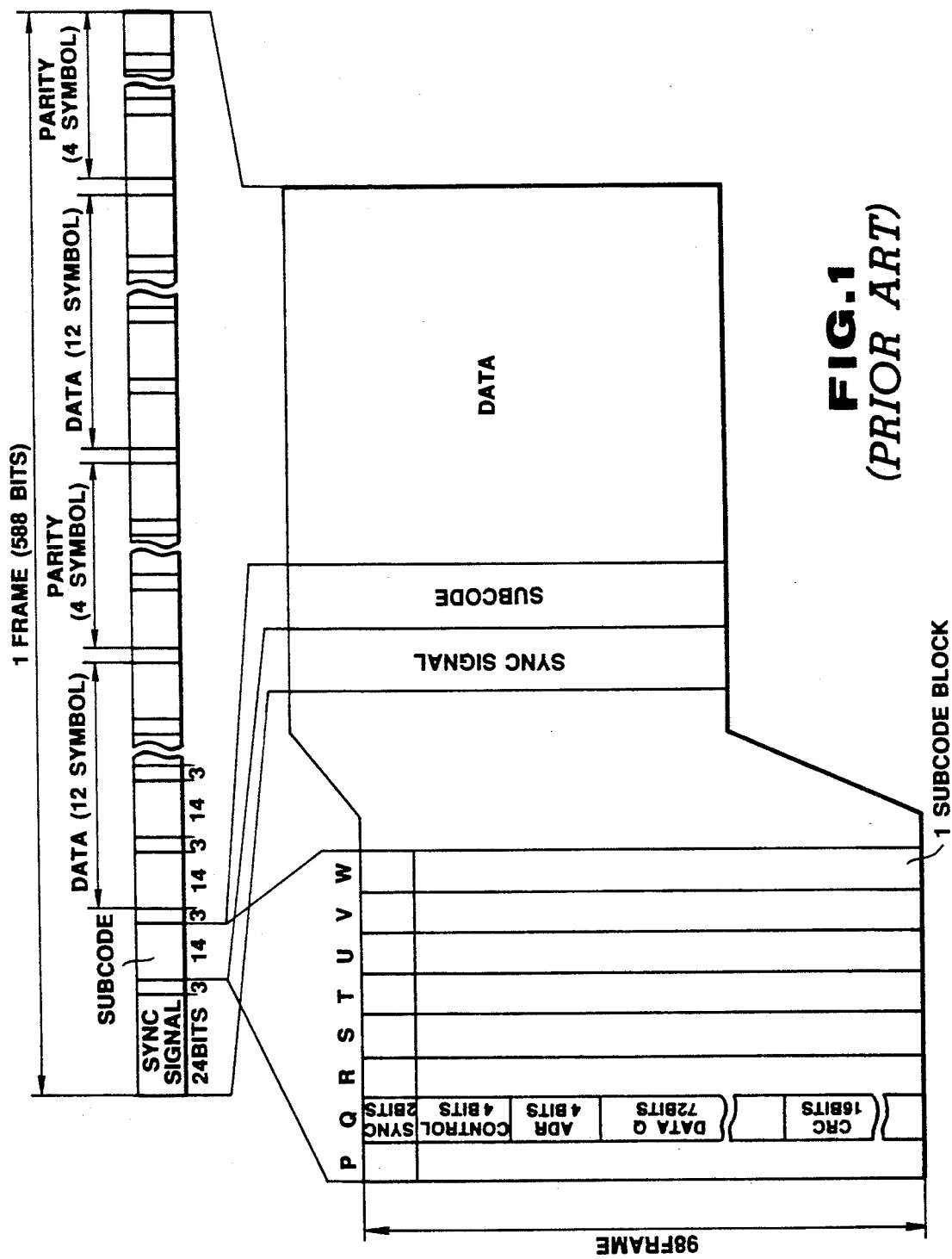
FIG. 1 is a diagrammatic view showing the data format of a compact disc (CD)

Referring to the drawings, certain illustrative embodiments of the present invention will be explained in more detail.

Figure 3:
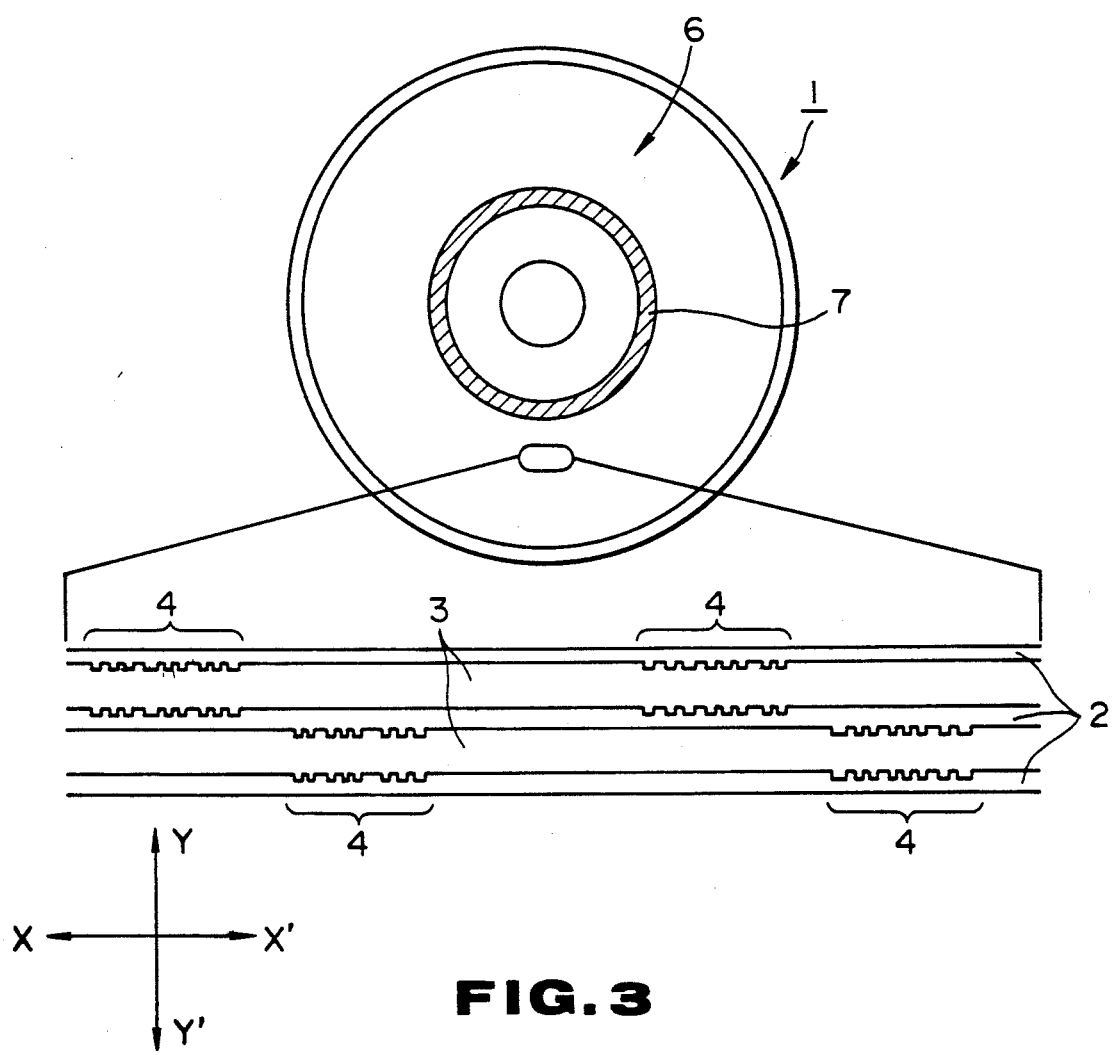
FIG. 3 is a diagrammatic plan view showing an optical disc as the recording medium according to a first embodiment of the present invention together with an enlarged detail view of three of the radial tracks thereon.

Referring now to FIG. 3 wherein all or part of the optical disc as the recording medium according to a first embodiment of the present invention is diagrammatically shown, a magneto-optical disc is employed as the optical disc 1 in which a perpendicularly magnetized film having magneto-optical effects is formed on a transparent base plate. The lands sandwiched between the spirally formed pregrooves 2 are formed as the recording track 3 and the block data completed by 2K bytes of data in accordance with the above described CD-ROM data format are photo-magnetically recorded on the recording track 3. A long portion of the length of the spiral track 3 constitutes the data region 6 where data are recorded.

In the recording track 3, address regions 4 are provided at equidistant positions along the length of the track 3 corresponding to the sync signal (SYNC) portion or to the error correction code (ECC) portion, in the above CD-ROM data format. Each address region 4 represents burst-like changes across the track width whereby 19-bit address data, for example, are prerecorded in each address region 4. The signal spectrum of the address data produced by the changes across the track width is selected to represent a component higher than that of the frequency spectrum of the servo region.

Radially interior from the data region 6 there is formed a lead-in region 7, in which there are recorded lead-in data indicating the recording state of the data region 6.

Figure 4:
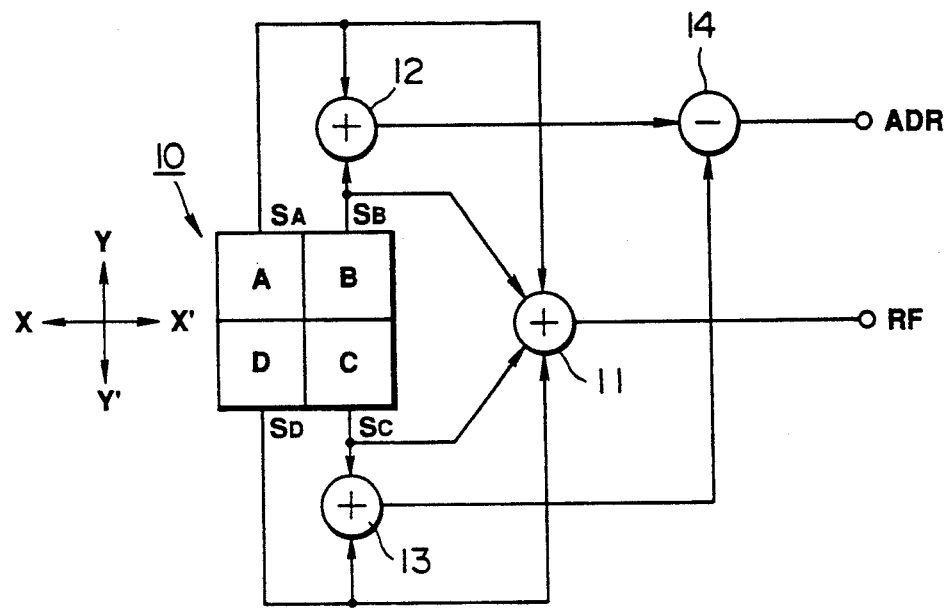
FIG. 4 is a diagrammatic view showing an arrangement of an optical pickup adapted for reading data on the optical disc depicted in FIG. 3.

In the optical disc 1 of the first embodiment of the invention there are recorded in each address region 4 address data of a predetermined bit number by the changes across the track width. As shown in FIG. 4, a four segment detector 10 composed of four photodetectors A, B, C and D is used in conjunction with a laser light source (not shown) as a data read-out optical pickup. Thus, a data signal RF can be detected in the form of a summation output signal $S_A+S_B+S_C+S_D$ obtained by summing the outputs $S_A$, $S_B$, $S_C$, and $S_D$ of the respective detectors A, B, C and D at an adder 11. On the other hand, an address information signal ADR can be detected in the form of a subtraction output signal equal to $(S_A+S_B)-(S_C+S_D)$ obtained by subtracting in a subtractor 14 a summation output $(S_C+S_D)$ of the outputs $S_C$ and $S_D$ of the detectors C and D produced by an adder 13 from a summation output $(S_A+S_B)$ produced by an adder 12 of the outputs $S_A$ and $S_B$ of the detectors A and B, wherein the detectors A, B and C, D are arranged in the longitudinal or $X-X'$ direction of the recording track 3, that is, in the form of push-pull outputs $S_A-S_D$ and $S_B-S_C$, and the detectors A, D and B, C are arranged in the widthwise direction or $Y-Y'$ direction of the recording track 3.

The address information ADR does not substantially affect the data signal RF. Thus, as shown in FIG. 5, the data recording region 5 can be extended up to and through the address region 4 of the recording track 3.

In the above described optical disc 1, the address regions 4 are provided at predetermined intervals along the length of the signal track 3, wherein the address information of the signal spectrum above the servo region is indicated as changes across the track width, so that the block data completed by 2K bytes of data in accordance with the CD-ROM data format can be recorded on or reproduced from the recording track 3 on the basis of the above address information without the tracking servo or focusing servo for the recording track 3 being disturbed by the address information or data.

Data recording can be made in two modes on the optical disc 1. One of such modes is that for the above described continuous recording. This mode for continuous recording is convenient for direct recording of CD-ROM data or of sequential data, such as musical data.

Figure 5:
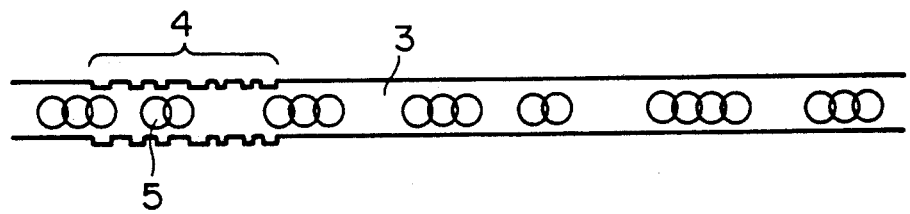
FIG. 5 is a diagrammatic view showing the data recording state on the recording track of the optical disc.

In this continuous recording mode, there is no time period which is devoid of data, so that, as shown in FIG. 5, the pits 5 are also formed in the address region 4, which is used simultaneously as the data record region.

The other mode is the mode for intermittent recording, which is convenient for recording data at randomly selected addresses, as in the case of CD-WO or CD-erasable.

Figure 2:
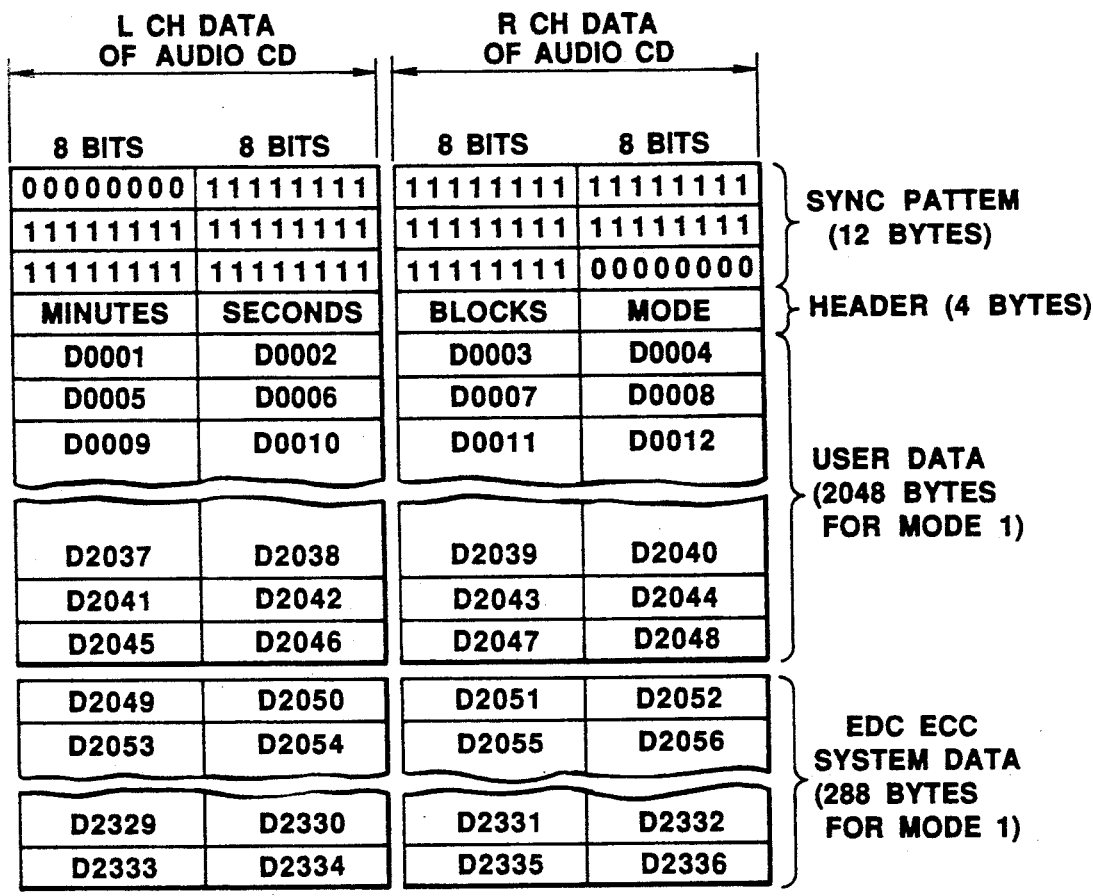
FIG. 2 is a diagrammatic view showing the data format of a CD-ROM.

The basic data structure for such an intermittent recording mode is similar to that for continuous recording except that the 12-byte sync signals for distinguishing from musical signals in the data format shown in FIG. 2 are not provided for in the intermittent record mode, in which data are recorded with a 98 frame sector as one recording unit. In each of these sectors, there are recorded the same data as those of the data format shown in FIG. 2 except the 12-byte sync signals for blocking the musical signals.

Thus, in the intermittent recording mode, a vacant region equivalent to 12 bytes can be procured in each sector having a total data capacity of 2352 bytes. This 12-byte vacant region corresponds to the address region 4.

Therefore, when data are recorded in the intermittent record mode, no data are recorded in the address regions 4, so that the address data recorded in the address regions are left over after data recording. Thus, the address information recorded in the address regions 4 can be resorted to for seeking desired sectors.

In the intermittent recording mode, the encoding completed in each sector is used instead of convolution encoding. Encoding complete in each sector can be realized by a method described in, for example, Japanese Patent Application No. 118567/1988 and U.S. patent application Ser. No. 351,837, filed May 12, 1989. The merging bit at the time of recording with EFM modulation is reset at each sector.

Figure 6:
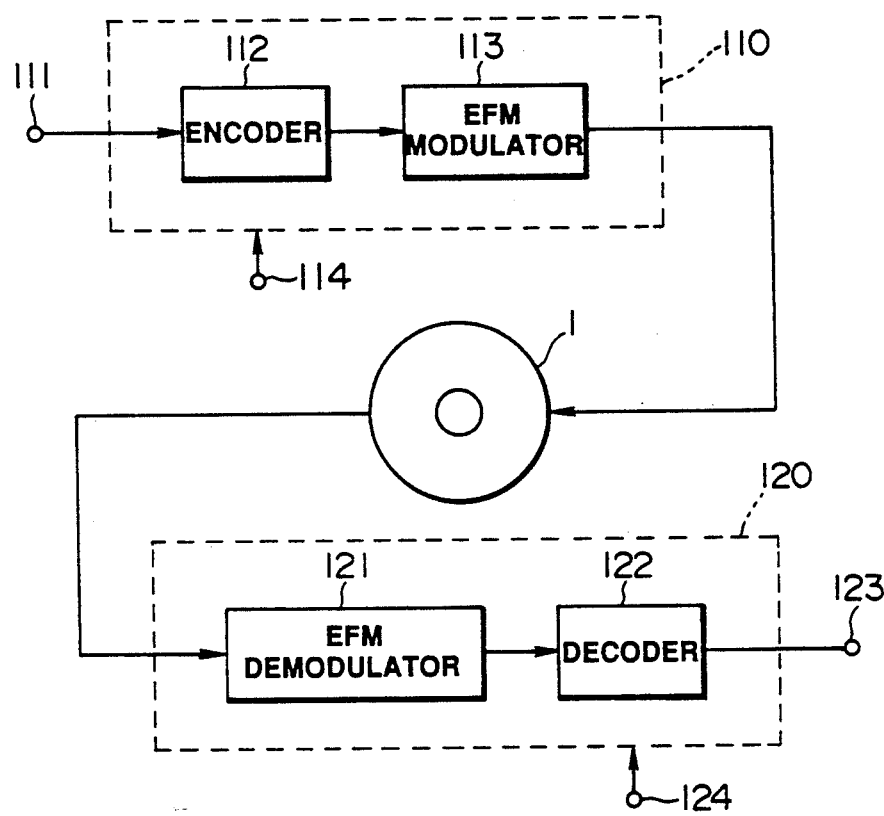
FIG. 6 is a block diagram showing an arrangement of a recording/reproducing apparatus employing the optical disc of the first embodiment as the recording medium.

FIG. 6 shows diagrammatically the digital data recording/reproducing apparatus to which the present invention is applied. This apparatus, described in detail in U.S. patent application Ser. No. 351,837, filed May 12, 1989 (which is incorporated herein by reference), is designed to record or reproduce digital data optically by using the optical disc 1 shown in FIG. 3 as the recording medium, and is provided with a recording circuit 110 and a reproducing circuit 120.

The optical disc 1 is provided with the above described address regions 4 in each of which are recorded physical address data as burst-like changes of the track width. The disc 1 performs a revolution at a constant linear velocity (CLV).

The recording circuit 110 can be set to the above described continuous record and intermittent record modes responsive to select signals from the terminal 114.

The 12-byte sync signals are provided in each sector for the continuous record mode but are not provided for in the intermittent record mode.

During recording, data to be recorded on the optical disc 1 are supplied from a data input terminal 111 to an encoder 112 of the recording circuit 110. The address of the optical disc 1 can be obtained from the address information recorded in the address information 4 so that a desired address can be sought to record the data therein. The data from the data input terminal 111 are developed in the encoder 112 into a predetermined frame structure for annexing duplex error correction codes of the C1 and C2 series. This encoding is by the convolution encoding for continuous record mode and by the sector-complete encoding for the intermittent record mode, as described in U.S. patent application Ser. No. 351,837, filed May 12, 1989. The data to which the duplex error correction codes are annexed at the encoder 112 are eight to fourteen modulated at the EFM circuit 113 so as to be recorded in the sector of the optical disc 1 bearing the desired address.

In the continuous record mode, data are recorded in the address regions 4 provided on the optical disc 1. Conversely, in the intermittent record mode, no data are recorded in the address regions 4 of the optical disc 1 so that the address data recorded in these address regions 4 as the burst-like changes of the track width remain unaffected.

The data recorded on the disc 1 can be reproduced by a sequence which is the reverse of the above described sequence adopted for recording.

Thus, the above described continuous record or intermittent modes can be set in the reproducing circuit 120 depending on the select signals from the terminal 124.

The reproduced data from the disc 1 are eight to fourteen demodulated at the EFM demodulating circuit 121 of the reproducing circuit 120 before being supplied to the decoder 122. Depending on the select signals from the terminal 124, the decoder 122 is switched between decoding processing corresponding to convolution encoding for the continuous record mode and that corresponding to the sector complete encoding for the intermittent record mode, with the decoded output being transmitted as the reproduced data at the output terminal 123.

When seeking the desired sector during reproduction, the information of the Q-channel of the subcode can be utilized in the continuous record mode. If the frequency spectrum of the address data recorded in the address regions 4 of the disc 1 in the form of the burst-like changes of the track width and the frequency spectrum of the data recorded by pits or the tracking signals are designed to be separable from each other, the address data recorded in the address region 4 can be used to seek the desired sector even when the recording is made with the continuous record mode.

In the intermittent record mode, the address information of the address regions 4 of the optical disc 1 are left over so that the address data recorded in the address regions 4 can be utilized in seeking the desired address.

In the above described optical disc of the present invention, address regions, each of a predetermined length, are provided at predetermined spacings along the track length and the physical address data are recorded in these address regions in the form of the changes of the track width, such that the address data recorded in these address regions can be utilized for writing the data in the desired sector.

The address data in the address regions are not recorded as the pits, so that data can be recorded in these address regions when the record data are recorded in the continuous record modes, as when recording musical data or CD-ROM data.

In the intermittent record mode for CD-WO or CD-erasable, the 12-byte sync pattern represents a vacant region which can be in registration with the address region 4. In this case, the address data recorded in the address region 4 are left over after the data recording such that the address data of the address region 4 can be utilized to perform a high speed accessing when seeking the desired sector.

Therefore, according to the present invention, the address data on the disc can be utilized when the present apparatus is used as a CD-WO or CD-erasable, while the interchangeability with a CD-ROM remains intact.

Figure 7:
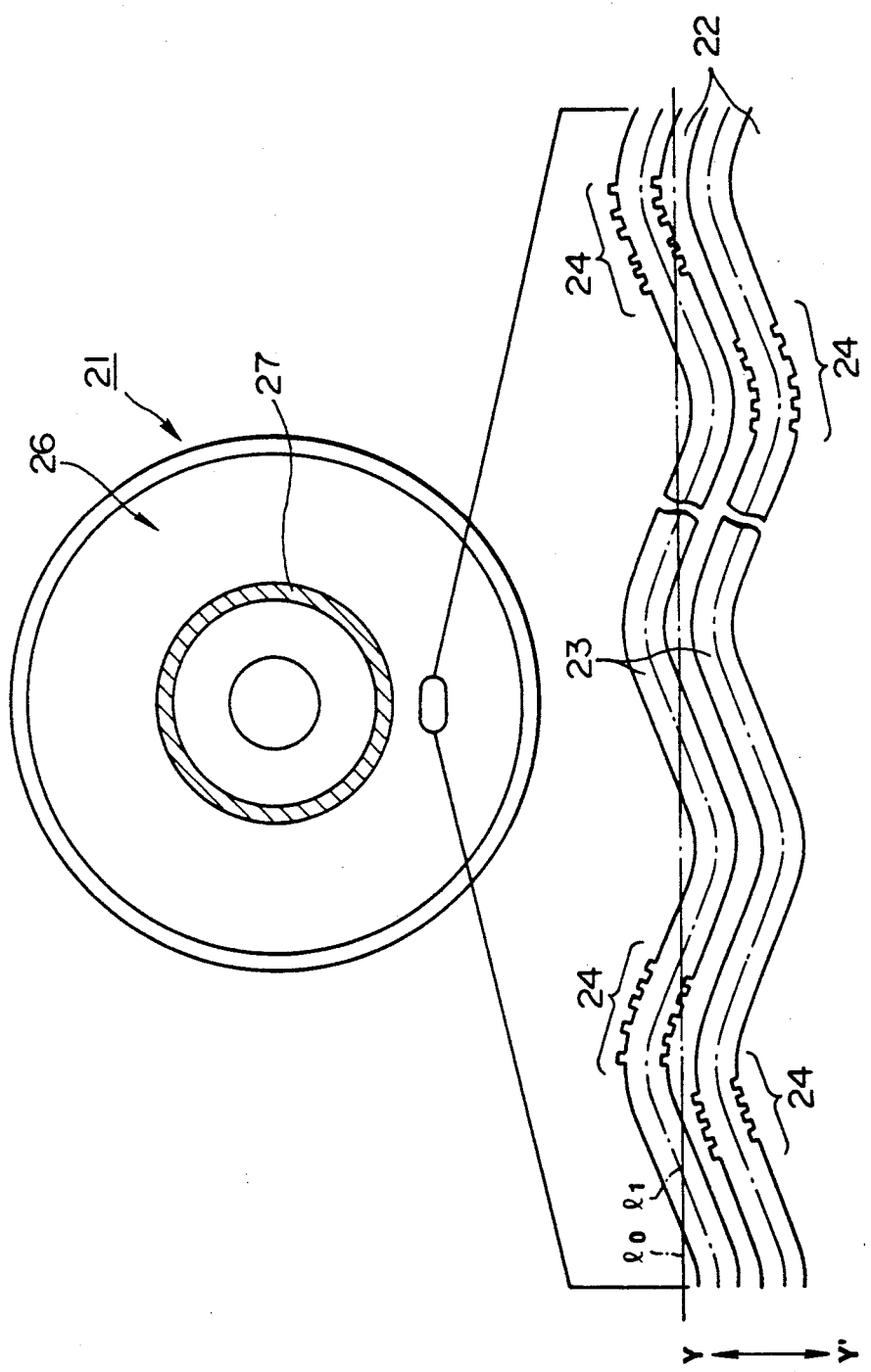
FIG. 7 is a diagrammatic plan view of an optical disc as the recording medium according to a second embodiment of the present invention.

Turning now to FIG. 7 which depicts an optical disc as the recording medium according to a second embodiment of the present invention, an optical disc 21 has a land between spirally formed pregrooves 22 as a recording track 23. The centerline $l_1$ of the recording track is deviated at a predetermined period across the track width or Y—Y' direction with respect to an imaginary centerline $l_0$. The recording track 23 has its width changed in a burst-like manner. Similarly to the optical disc 1 of the foregoing first embodiment, the 2K-byte complete block data in accordance with the aforementioned CD-ROM data format are recorded photo-magnetically on the track 23.

In the optical disc 21 of the present second embodiment, the recording track 23 is in the form of a sinusoidal wave for affording predetermined period data WCK corresponding to a sampling frequency of 22.05 kHz which is one half the data sampling frequency 44.1 kHz of the CD-ROM. In addition, there are formed address regions 24 at predetermined intervals and in register with the sync signal SYNC or error correction signal ECC in the CD-ROM data format, wherein the address regions 24 are each formed as burst-like track changes across the track width. The address data of, for example, 19 bits, are pre-recorded by these track changes in the widthwise direction. The signal spectrum of the address data formed by the track width change is selected to be higher than the signal spectrum of the servo region.

Radially inside of the data region 26 of the optical disc 21, there is formed a lead-in region 27, into which there are recorded the lead-in data indicating the recording state of the data region 26.

In the present second embodiment the data signals RF can be detected as the summation output signal $(S_A+S_B+S_C+S_D)$ from the adder 11 while the period information WCK and the address data ADR can be detected as the subtraction output signal $(S_A+S_B)-(S_C+S_D)$ from the subtractor 14 by utilizing the four segment detector 10 shown in FIG. 4 as in the case of the above described first embodiment of the present invention.

Figure 8:
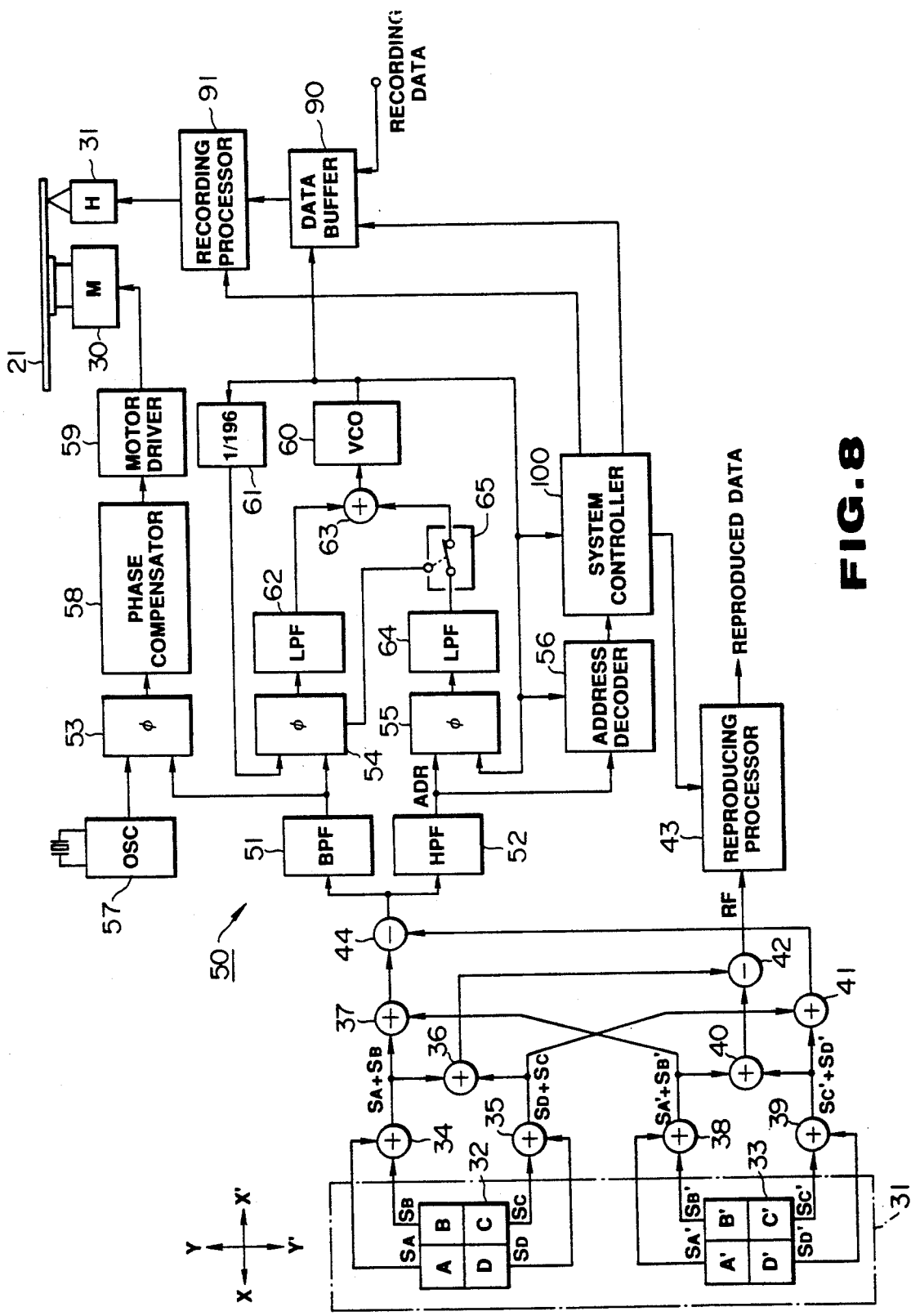
FIG. 8 is a block diagram showing the recording reproducing apparatus employing the optical disc of the second embodiment as the recording medium.

The block view of FIG. 8 shows the arrangement of the recording/reproducing apparatus wherein the optical disc 21 shown in FIG. 7 is used as the recording medium.

The recording/reproducing apparatus is so designed that the recording track 23 of the optical disc 21 is scanned optically by means of an optical pickup 31 for recording/reproducing data formulated in accordance with the above described CD-ROM data format, while the disc 21 is rotated at a constant linear velocity by a spindle motor 30.

The optical pickup 31 is mainly constituted by a laser diode (not shown) which outputs a laser beam for data recording/reproduction, a photosensor for optically detecting data in the form of reflected light from the recording track of the optical disc 21, and an optical system (not shown) for irradiating the optical disc 21 with the laser beam from the laser diode and transmitting the reflected return beam from the disc 21 towards the photodetector. The optical pickup 31 includes two four segment photodetectors 32, 33 as the photosensor, and is so arranged that the return laser beam from the disc 21 is transmitted to the four-segment photodetectors 32, 33 after separation into a P polarized component and an S polarized component in the optical system (by means not shown).

As for the detection output from the four-segment photodetector 32, to which the P polarized component of the return beam is transmitted, the outputs $S_A$ and $S_B$ of the detectors A and B, arrayed in the longitudinal direction (X—X' direction) of the recording track 23 of the disc 21, are supplied to an adder 34, while the outputs $S_C$, $S_D$ of the detectors C and D are supplied to an adder 35.

The summation output signal $(S_A+S_B)$ from the adder 34 is supplied to adders 36 and 37, while the summation output signal $(S_C+S_D)$ from the adder 35 is supplied to the adder 36 and an adder 41.

As for the detection output from the four segment photodetector 33, to which the S polarized component of the return beam is transmitted, the outputs $S_A'$ and $S_B'$ of the detector A' and B' arrayed in the longitudinal direction (X—X' direction) of the recording track 23 of the disc 21 are supplied to an adder 38, while the outputs $S_C'$, $S_D'$ of the detectors C' and D' are supplied to an adder 39.

The summation output signal $(S_A'+S_B')$ from the adder 38 is supplied to the adder 37 and an adder 40 whereas the summation output signal $(S_C'+S_D')$ from the adder 39 is supplied to the adder 40 and the adder 41.

The summation output signal $(S_A+S_B+S_C+S_D)$ by the adder 36 and the summation output signal $(S_A'+S_B'S_C'+S_D')$ by the adder 40 are supplied to a subtractor 42, whereby a reproduced RF signal or RFS, where:

$$RFS=(S_A+S_B+S_C+S_D)-(S_A'+S_B'+S_C'+S_D')$$

is produced as the subtraction output signal from the subtractor 42.

This reproduced RF signal or RFS is supplied to a reproducing block 43, where the operation of reproducing the 2K byte complete block data (the data within one block or sector of FIG. 2) formed in accordance with the above described CD-ROM data format and photomagnetically recorded on the record track 23 of the optical disc 21 is performed under the control of a system controller 100 to reproduce the block data from the reproduced RF signals (RFS).

On the other hand, the summation output signal $(S_A+S_B+S_A'+S_B')$ from the adder 37 and the summation output signal $(S_C+S_D+S_C'+S_D')$ from the adder 41 are supplied to a subtractor 44, from which a subtraction output signal RFC, where:

$$RFC=(S_A+S_B+S_A'+S_B')-(S_C+S_D+S_C'+S_D')$$

is produced and supplied to a control block 50.

At the input stage of the control block 50, the output of the subtractor 44 is supplied to a bandpass filter 51 making use of a tank circuit having a high Q and a resonance frequency of 22.05 kHz for separating the reproduced control signals RFC from the 22.05 kHz sinusoidal signal component supplied from the recording track 22 of the disc 21 having the shape of the sinusoidal wave. The sinusoidal wave signal component corresponds to the predetermined period information WCK. The output of the subtractor 44 is also supplied to a high-pass filter 52 for separating the address data component ADR, pre-recorded in the recording track 22 of the disc 21 as the track width changes, from the reproduced control signals RFC.

Figure 9:
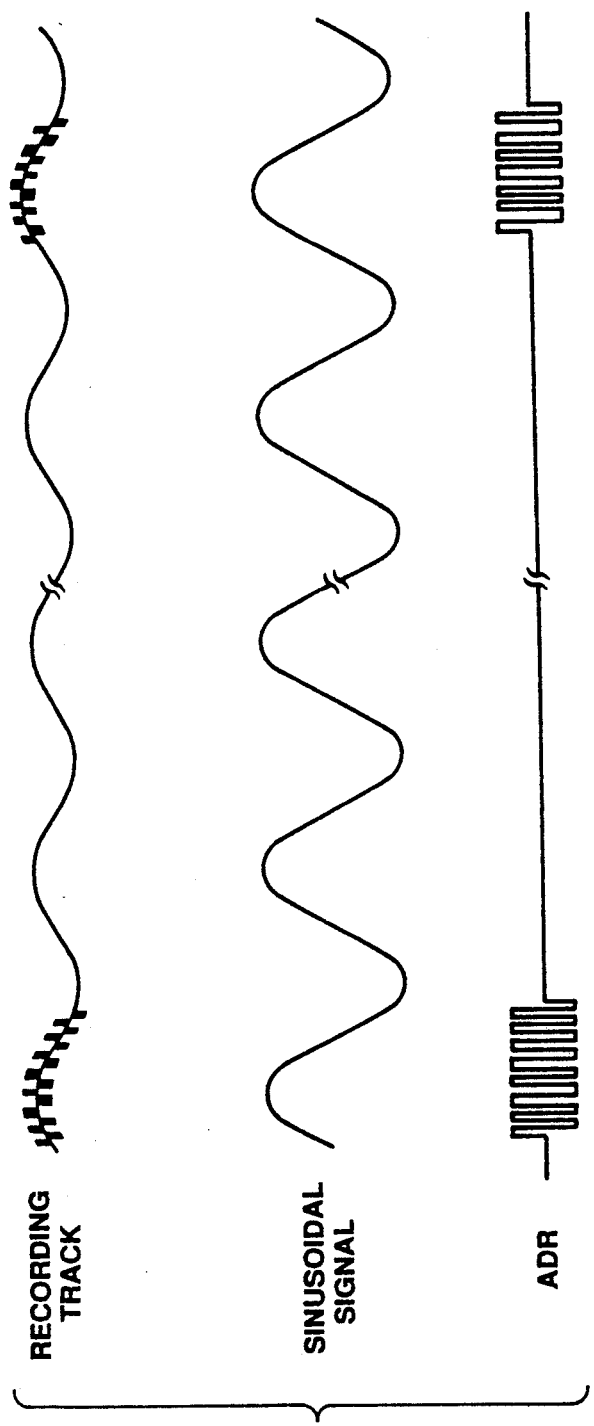
FIG. 9 is a waveform diagram for illustrating the operation of the recording/reproducing apparatus.

The sinusoidal wave signals (FIG. 9) corresponding to the predetermined period data (WCK), which signals are separated by the bandpass filter 51, are supplied to phase comparators 53 and 54, while the address data component signals ADR, separated from the reproduced control signals RFC at the highpass filter 52, are supplied to a phase comparator 55 and an address decoder 56.

The phase comparator 53 performs a phase comparison between a reference phase signal from a reference oscillator 57 for spindle servoing and the aforementioned sinusoidal wave signal obtained at the bandpass filter 51 and transmits the comparison output via a phase compensation circuit 58 to a driving circuit 59 of the spindle motor 30 to constitute a spindle servo system for rotationally driving the optical disc 21 at a constant linear velocity.

The phase comparator 54 performs a phase comparison between the output of a frequency divider 61, which divides the oscillation output of a voltage controlled oscillator 60 by a factor of 196, and the aforementioned sinusoidal wave signal obtained at the bandpass filter 51. The comparison output is transmitted through at low pass filter 62 to a signal adder 63 whose output is supplied to the control input terminal of the voltage controlled oscillator 60. Together, the circuits 54, 60, 61, 62 and 63 constitute a so-called phase locked loop (PLL) type clock reproducing system wherein the oscillation phase of the voltage controlled oscillator 60 is matched to the phase of the aforementioned sinusoidal wave signal.

The phase comparator 55 performs a phase comparison between the oscillation output of the voltage controlled oscillator 60 and the signal of the address data component ADR produced at the output of the highpass filter 52 and transmits the comparison output through a lowpass filter 64 to the signal adder 63 via a switch 65 to constitute a so-called PLL control system wherein the oscillation phase of the voltage controlled oscillator 60 is matched to the bit clock phase of the address data (ADR).

The switch 65 is controlled by an output of the phase comparator 54 of the clock reproducing system so as to be closed initially and opened when the oscillation phase of the voltage controlled oscillator 60 is phase-locked to the sinusoidal wave signal. Preferably, the control is so made that, after the bit clock phase of the address data ADR has been detected correctly, the switch 65 is closed only during the address period.

Under PLL control by the comparison outputs of the phase comparators 54, 55, the voltage controlled oscillator 60 outputs system clocks having the frequency of 4.3218 MHz matched to the bit clock phase of the address data ADR.

The system clocks produced by the voltage controlled oscillator 60 are supplied to the system controller 100 adapted to control the operation of the recording/reproducing apparatus, while being supplied simultaneously to the address decoder 56 and the record data buffer memory 90.

From the signals of the address data ADR produced at the highpass filter 52, the address decoder 56 decodes the address data ADR on the basis of the system clocks and transmits the address data ADR to the system controller 100.

In the record mode, the system controller 100 controls the data buffer memory 90 supplied with the recording data and transmits the record data from the data buffer memory 90 to the recording processor 91 as the control is made for each data block as one unit based on the address data ADR. The recording operation is controlled so that the block data completed by 2K bytes in accordance with the CD-ROM data format will be photomagnetically recorded on the record track 23 of the optical disc 21.

In the reproducing mode, the system controller 100 controls the data processing operation by the reproducing processing block 43 for reproducing the block data completed with 2K bytes, while performing control on a block-by-block basis using the address data ADR. The 2-byte complete block data are formed in accordance with the CD-ROM data format and are photomagnetically recorded on the recording track 23 of the optical disc 21.

In the recording medium of the present invention, the recording track width is changed in a burst fashion at regular intervals along the track length such that the control data having a predetermined number of bits are pre-recorded by the changes across the track width as the information for performing a block by block control of the recording data using the control data.

In the recording medium of the present invention, the track centerline is periodically displaced across the track width with respect to the imaginary track centerline, while the track width is changed in a burst-like fashion. In this manner, the period data are recorded previously by the deviation across the track width of the track centerline as the data for block-by-block control of the record data. Simultaneously, the control data having a predetermined number of bits are pre-recorded by the track width changes such that a block-by-block control of the recording data can be made on the basis of the period data and control data.

According to the optical disc of the present invention, one subcode block is constituted by a predetermined frame, and the absolute address data can be pre-recorded as the control data in the form of record track width changes, so that the absolute address data of one sub-block can be obtained by reading out the one sub-block in its entirety. Thus the data recorded or reproduced by the medium of the record track can be controlled on the basis of the above address data so that the data can be controlled efficiently for each block completed with 2K bytes. In addition, even when the data of the CD or CD-ROM data format are recorded on the recording track, the address data of a predetermined number of bits pre-recorded as the changes in the width of the recording track do not affect the data of the CD or CD-ROM format, so that interchangeability can be maintained with respect to the CD or CD-ROM.

Also, according to the recording apparatus of the present invention, the recording operation is controlled by the control means on the basis of the control or period data and control data detected from the recording medium by detection means so that block-by-block control of the recording data can be performed simply and reliably.

In addition, according to the reproducing apparatus of the present invention, the reproducing operation is controlled by control means on the basis of the control or period data and control data detected from the recording medium by detecting means so that block-by-block control of the recording data can be performed simply and reliably.

Although the present invention has been shown and described with respect to preferred embodiments, various changes and modifications which are obvious to a person skilled in the art to which the invention pertains are deemed to lie within the spirit and scope of the invention.

What is claimed is:

1. A recording medium having a recording track comprising first portions alternating at regular intervals with second portions, wherein the recording track has substantially constant width along each of the first portions, and changing width along each of the second portions, wherein the changing width along each of the second portions determines a set of a predetermined number of control data bits, wherein each said set of said predetermined number of bits determines address data for a different data block.

2. The recording medium of claim 1, wherein information data are recorded in said second portions.

3. A recording medium having a recording track comprising first portions that alternate at regular intervals with second portions, wherein the recording track has substantially constant width along each of the first portions, and changing width along each of the second portions, wherein the changing width along each of the second portions represents a predetermined number of control data bits, wherein each said predetermined number of control data bits are address data for each data block as one unit, wherein information data are also recorded in said second portions, and wherein the information data are convolution encoded.

4. A recording medium comprising:
a recordable surface; and
a recording track on the recordable surface, having a track width and a centerline, wherein the track has first portions alternating at regular intervals with second portions, wherein the track width is substantially constant along each of the first portions and the track width changes along each of the second portions, wherein the centerline is periodically displaced relative to the track width and wherein displacement of the centerline relative to the track width represents period data, and wherein the changes in the track width along each of the second portions represents a predetermined number of control data bits.

5. The recording medium of claim 4, wherein each said predetermined number of control data bits represent address data for a different data block.

6. The recording medium of claim 5, wherein information data are recorded in the second portions.

7. A recording medium comprising:
a recordable surface; and
a recording track on the recordable surface, having a track width and a centerline, wherein the track has first portions alternating at regular intervals with second portions, wherein the track width is substantially constant along each of the first portions and the track width changes along each of the second portions, wherein the centerline is periodically displaced relative to the track width, wherein displacement of the centerline relative to the track width represents period data, wherein the changes in the track width along each of the second portions represents a predetermined number of control data bits, wherein each said predetermined number of control data bits represent address data for a different data block, wherein information data are recorded in the second portions, and wherein the information data are convolution encoded.

8. An apparatus for use with a recording medium of the type which includes a recording track whose width changes along said recording track to represent control information, wherein record data is also recorded along the recording track, said apparatus comprising:
detecting means for detecting the control information and the record data, said detecting means including two pairs of detectors, each of said pairs of detectors being arranged across the track width; and
means for adding and subtracting output signals from selected ones of the detectors, to generate control signals representing said control information.

9. The apparatus according to claim 9 wherein the control signals represent address data.

10. An apparatus for use with a recording medium of the type which includes a recording track whose width changes along said recording track to represent address data, wherein record data is also recorded along the recording track, said apparatus comprising:
detecting means for detecting the address and the record data, said detecting means including two pairs of detectors, each of said pairs of detectors being arranged across the track width; and
means for adding and subtracting output signals from selected ones of the detectors, to generate control signals representing said address data, wherein the record data are convolution encoded.

11. A recording apparatus for use with a record medium of the type having a recording track, wherein the recording track has a centerline and a track width, and wherein the centerline is periodically displaced relative to the track width to represent period data, and wherein the track width changes along the recording track to represent control data, said recording apparatus including:
detecting means for detecting the period data and the control data, the detecting means including at least two pairs of detectors, each of said pairs being arranged across the track width, and also including means for combining an output signal from a first detector in each of the pairs with an output signal from a second detector in said each of the pairs to generate push-pull output signals, wherein the push-pull output signals represent said period data and said control data, and
control means for controlling the recording of record data on the recording track based on the period data and the control data as represented by the push-pull output signals.

12. A recording apparatus as recited in claim 11 wherein the detecting means includes means for adding the output signal from the first detector in said each of the pairs to the output signal from said second detector in said each of the pairs.

13. A reproducing apparatus for use with a recording medium of the type which includes a recording track whose width changes along the recording track to represent control data, comprising:
detecting means for detecting the control data signals recorded on the recording track, the detecting means including two pairs of detectors, each of the pairs being arranged across the track width, and also including means for combining an output signal from a first detector in each of the pairs with an output signal from a second detector in said each of the pairs to generate push-pull output signals, wherein the push-pull output signals represent said control data, and
control means for controlling reproduction of data recorded on the recording track in response to the push-pull output signals.

14. A recording medium having a recording track comprising first portions alternating at regular intervals with second portions, wherein the recording track has substantially constant width along each of the first portions, and changing width along each of the second portions, wherein the changing width along each of the second portions represents a predetermined number of control data bits, wherein each said predetermined number of control data bits represent address data for a different data block, and wherein the recording track includes pits in said second portions which represent record data, wherein the record data are encoded in accordance with a sector complete type encoding algorithm.

15. A recording medium, comprising:
a recordable surface; and
a recording track on the recordable surface, having a track width and a centerline, wherein the track has first portions alternating at regular intervals with second portions, wherein the track width is substantially constant along each of the first portions and the track width changes along each of the second portions, wherein the centerline is periodically displaced relative to the track width and wherein displacement of the centerline relative to the track width represents period data, and wherein the changes in the track width along each of the second portions represents a predetermined number of control data bits, wherein each said predetermined number of control data bits represent address data for a different data block, wherein the recording track includes pits in the second portions which represent record data, wherein the record data are encoded in accordance with a sector complete type encoding algorithm.

16. An apparatus for use with a recording medium including a recording track whose width changes along said recording track to represent control information, wherein the recording track includes regions containing widthwise changes, and wherein record data is recorded in said regions, said apparatus comprising:
detecting means for detecting the control information and the data, said detecting means including two pairs of detectors, each of said pairs of detectors being arranged across the track width; and
means for adding and subtracting output signals from selected ones of the detectors, to generate control signals representing said control information, wherein the control signals represent address data, wherein the record data are encoded in accordance with a sector complete type encoding algorithm.

17. An optical recording medium having a recording track comprising first portions alternating at regular intervals with second portions, wherein the recording track has substantially constant width along each of the first portions, and changing width along each of the second portions, wherein the changing width along each of the second portions represents a predetermined number of control data bits for use in recording data on the recording track or reproducing data therefrom.

18. The optical recording medium according to claim 17 wherein the control data bits represent address information.

19. The optical recording medium according to claim 17, including at least two recording tracks formed concentrically thereon, each of said recording tracks comprising first portions alternating at regular intervals with second portions, wherein said each of the recording tracks has substantially constant width along each of the first portions, and changing width along each of the second portions, wherein the changing width along each of the second portions represents a predetermined number of control data bits.

20. The optical recording medium according to claim 17 wherein the recording track is formed spirally.

* * * * *